United States Patent
Koivu

(10) Patent No.: US 6,266,332 B1
(45) Date of Patent: Jul. 24, 2001

(54) CELLULAR RADIO SYSTEM AND A BASE STATION

(75) Inventor: Vesa Koivu, Oulu (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 08/836,300

(22) PCT Filed: Nov. 6, 1995

(86) PCT No.: PCT/FI95/00606

§ 371 Date: May 6, 1997

§ 102(e) Date: May 6, 1997

(87) PCT Pub. No.: WO96/14720

PCT Pub. Date: May 17, 1996

(30) Foreign Application Priority Data

Nov. 7, 1994 (FI) .......................................... 945223

(51) Int. Cl.[7] .......................................... H04J 3/16
(52) U.S. Cl. .......................................... 370/336
(58) Field of Search .......................................... 370/336, 328, 370/329, 331, 337, 338, 345, 347, 348, 330, 441, 442, 342, 480, 465, 461, 460, 344, 343, 320, 321, 319; 455/436, 443, 444, 454, 513, 424, 507, 525, 560, 561, 437, 438

(56) References Cited

U.S. PATENT DOCUMENTS

| | | | |
|---|---|---|---|
| 3,898,390 | * 8/1975 | Wells et al. .......................... | 455/438 |
| 4,268,722 | * 5/1981 | Little et al. .......................... | 370/338 |
| 4,347,626 | 8/1982 | Wenzel .................................. | 455/502 |
| 5,157,709 | * 10/1992 | Ohteru .................................. | 370/329 |
| 5,297,193 | 3/1994 | Bouix et al. .......................... | 370/328 |
| 5,359,603 | 10/1994 | McTiffin ............................... | 455/423 |
| 5,390,366 | * 2/1995 | Kasugai ................................. | 370/336 |
| 5,430,724 | * 7/1995 | Fall et al. ............................. | 370/337 |
| 5,436,900 | * 7/1995 | Hammer et al. ..................... | 370/336 |
| 5,475,689 | * 12/1995 | Kay et al. ............................ | 370/337 |
| 5,737,328 | * 4/1998 | Norman et al. ...................... | 370/331 |
| 5,761,195 | * 6/1998 | Lu et al. ............................... | 370/329 |
| 5,822,361 | * 10/1998 | Nakamura et al. .................. | 370/330 |
| 5,848,064 | * 12/1998 | Cowan ................................. | 370/338 |
| 5,910,947 | * 6/1999 | Futamura ............................. | 370/332 |

FOREIGN PATENT DOCUMENTS 534 612   3/1993 (EP) .

\* cited by examiner

Primary Examiner—Dang Ton
(74) Attorney, Agent, or Firm—Pillsbury Winthrop LLP

(57) ABSTRACT

The invention relates to a cellular radio system for transmitting communication signals from the base to the base station controller. The system includes transmission units which are used for transmitting communication signals between base stations and the base station controller. The communication signals feed a base station specific identification message to the base station controller by utilizing a predetermined communication channel in response to the base station initialization process.

8 Claims, 1 Drawing Sheet

CELLULAR RADIO SYSTEM AND A BASE STATION

This application is the national phase of international application PCT/FI95/00606 filed Nov. 6, 1995 which designated the U.S.

BACKGROUND OF THE INVENTION

1. Field of the Invention

The present invention relates to a cellular radio system comprising a base station controller and base stations connected to it. The invention further relates to a base station of a cellular radio system, comprising transmission units for transmitting communication signals to the base station controller and for receiving communication signals from the base station controller on a communication link, whereby the transmission units are arranged to feed a base station specific identification message to the base station controller by utilizing a predetermined communication channel in response to the base station initialization.

The term initialization in this context refers to a procedure carried out, for example, when the supply power is for the first time connected to the base station, after which the base station carries out initial functions programmed for it.

2. Description of Related Art

The invention relates to a communication network of a cellular radio system, such as the GSM (Groupe Spécial Mobile) or DCS (Digital Cellular System), and particularly to the communication link between base stations and the base station controller. The prior art technology recognizes cellular radio systems in which all base stations connected to the same communication link (a chain or a ring network), such as a 2 Mbit/s PCM connection, are assigned a dedicated, base station specific communication channel, i.e. a PCM (Pulse Code Modulation) time slot, which is utilized by the base stations as they for the first time establish a connection to the base station controller. This means that the base stations, in connection with the initialization following the installation, for example, from the very beginning establish contact to the base station controller on a base station specific O&M channel (Operation & Maintenance) assigned to them. In order for this to be possible, the person who installs the base station must, at the installation stage, feed data concerning the channel configuration of the system to the base station. In practice, this takes place so that the base station installer, during the installing, connects a portable microcomputer or a service terminal specifically intended for the initialization of transmission units to the base station, by means of which service terminal he feeds transmission branching tables of the system to the base station, indicating, among other things, which PCM time slots are allocated for use by the base station in question, and which PCM time slots the base station should repeat forward in the network.

The most serious weakness of the above-mentioned prior art solution is the difficulty concerning its application. In order for the installer to be able to feed the base station with correct data, he must have a considerable amount of information on the channel allocation of the network. In addition, it is difficult to correct any errors that may occur in the feeding process, because that would require another visit by the installer to the base station site (errors, if any, are usually detected only afterwards). If the configuring of a base station fails, for example, in connection with a reconfiguration of the network during, e.g., channel re-allocation, the installer must visit the base station site to feed the base station with the new data by means of the service terminal.

SUMMARY OF THE INVENTION

It is an object of the present invention to solve the aforementioned problems and to provide a cellular radio system in which the configuring of base stations is considerably simpler than in the prior art solutions. This object is achieved by a cellular radio system according to the invention, characterized in that the system comprises at least two base stations which are arranged to transmit a base station specific identification message to the base station controller by utilizing the same predetermined communication channel during their initialization, and that the base station controller comprises means for assigning a predetermined base station specific communication channel to a base station by utilizing said predetermined communication channel in response to receiving the identification message.

The invention further relates to a base station which can be utilized in the system according to the invention. The base station according to the invention is characterized in that the base station is arranged to is receive a message from the base station controller on said predetermined communication channel, and to adjust the transmission units onto a communication channel assigned by said message (S1).

The invention is based on the idea that when a common communication channel is reserved for the base stations in the system, and the base stations are arranged to utilize said common channel when they for the first time contact the base station controller, it is possible to carry out the configuring of the transmission units of the base stations so that the base station controller feeds data concerning the network configuration to the base stations by using said common channel, i.e. assigns each base station a dedicated communication channel. Therefore, it is unnecessary to carry out the configuring of the transmission units of the base stations at the installation site during the installing of the base station, but it can be performed by remote control from the network management center. Thus, the most significant advantages of the system and base station according to the invention are the facts that it is considerably faster and easier to carry out the configuring of the transmission units of the base stations during the installing; that the configuring of the base stations can be carried out in a centralized manner whereby the error possibility decreases; that the correcting of errors which may have occurred during the configuring or reconfiguring of the base station no longer requires a visit by the installer to the base station; and that the channel configuration of the network does not have to be finally determined when the base station or stations are being installed, because its/their transmission units can be configured afterwards.

The preferred embodiments of the system and base station according to the invention are disclosed in the attached dependent claims 2–3 and 5–6. In the following, the invention will be described in closer detail by means of a preferred embodiment according to the invention with reference to the attached drawings, in which

BRIEF DESCRIPTION OF THE DRAWINGS

FIG. 1 is a block diagram illustration of a preferred embodiment of a cellular radio system according to the invention. The block diagram of FIG. 1 shows a part of a GSM (Groupe Spécial Mobile) communication network.

DESCRIPTION OF THE PREFERRED EMBODIMENTS

Figure 1:
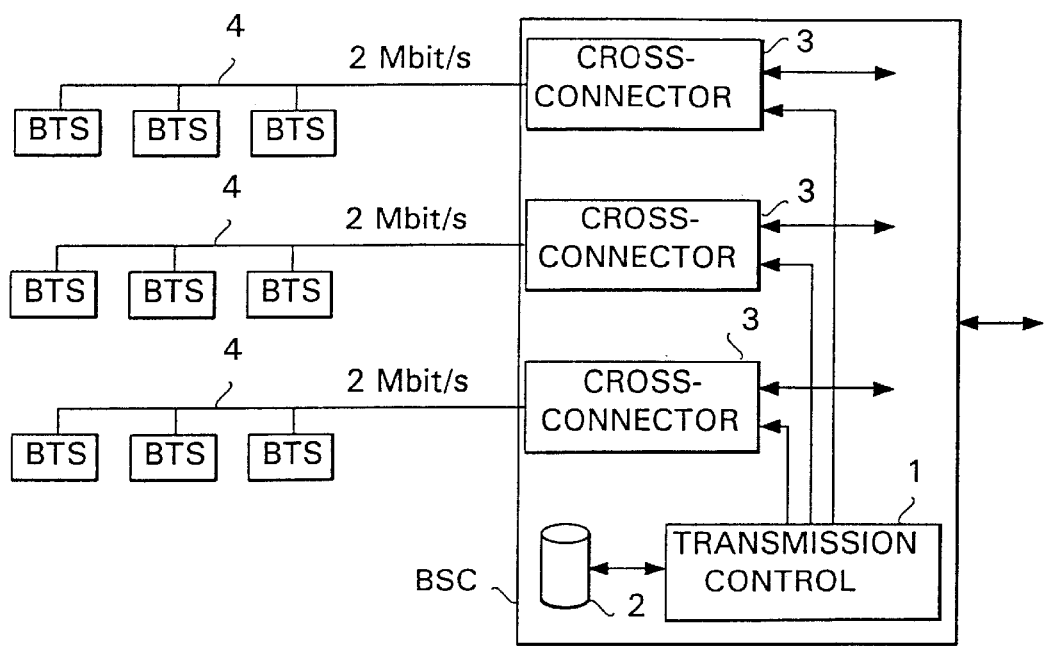
FIG. 1 is a block diagram illustration of a cellular radio system according to the invention.

The base station controller BSC of FIG. 1 communicates with the mobile services switching center (not shown in the figure) of the network in order to forward calls between the mobile services switching center and the base stations BTS. Base stations are connected to the base station controller by means of three 2 Mbit/s PCM branches 4 (Pulse Code Modulation) whereby, in connection with the network configuring, a certain number of time slots are allocated in a PCM connection for each base station. The data concerning the channel configuration of the network, i.e. the transmission branching tables of the base stations, are stored in the memory 2 of the base station controller. It is possible for the operator to edit the data stored in the memory 2 by remote control from his control room.

In the case of FIG. 1, a common channel consisting of one or more time slots of the PCM connection, or parts of it, has been allocated in each of the three PCM connections 4 to be commonly used by each base station connected to it. Thus, said channel may consist of one PCM time slot (64 kbit/s) or, for example, ¼ of a PCM time slot (16 kbit/s), or alternatively of more PCM time slots (n×64 kbit/s). As the common channel of the base stations, it is possible to use the same channel in all three branches 4, or alternatively a different channel may be used in each branch, depending on the case. The transmission units of all the base stations BTS connected to a certain branch 4 have been adjusted in connection with the assembly so that the base stations, in connection with the initialization, transmit a predetermined identification message (cf. FIG. 2) to the base station controller by utilizing the common channel of the branch. If the common channel for a reason or another is busy, the base station waits on for a while, and then repeats the attempt until it succeeds in transmitting the identification message.

Each PCM branch 4 is connected to the base station by a cross connector 3. The cross connectors 3 are adjusted so that they monitor the messages transmitted on the common channel of the branch 4 in question. As an identification message on the common channel of the branch 4 in question is detected by any one of the cross connectors 3, it forwards said message to a transmission control 1 of the base station controller. The transmission control 1 may be common for all the PCM branches 4, as in FIG. 1, or alternatively it is possible to arrange to the base station controller a dedicated transmission control for each PCM branch 4.

Upon receiving an identification message from a base station BTS, the transmission control 1 searches a transmission table stored in the memory 2 for said base station, and transmits it to the base station by utilizing the same common transmitting channel on which the base station BTS initially contacted the base station controller BSC. When the base station BTS that transmitted the identification message receives the data transmitted by the base station, it breaks the connection to the base station controller, after which it adjusts its transmission unit on the basis of the data it received, whereby it discontinues utilizing the common channel and moves to use the base station specific O&M channel assigned to it by means of the transmission branching table. The aforementioned procedures (utilization of the common channel, etc.) are repeated if the base station is re-initialized, for example, by remote control from the system control center.

Figure 2:
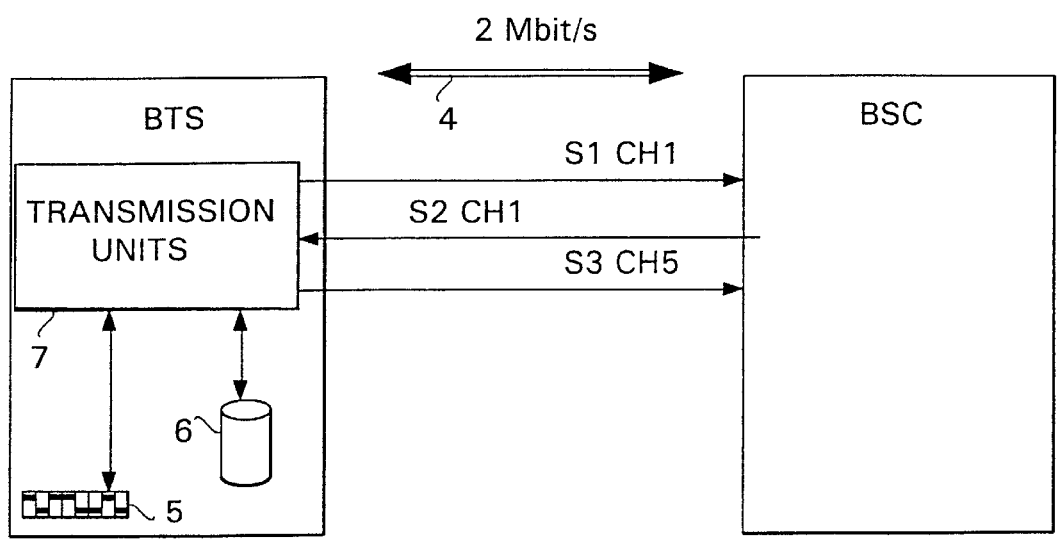
FIG. 2 illustrates a detail of the system shown in FIG. 1.

FIG. 2 illustrates a detail of the system shown in FIG. 1. FIG. 2 illustrates signalling between a base station BTS and a base station controller BSC in connection with the base station BTS initialization.

In connection with the assembly of the base station or, alternatively, its installation, the installer determines an identifier for the base station by means of a DIP switch 5. The transmission units 7 of the base station BTS are arranged to check the position of the DIP switch, i.e. to read the base station identifier from it in connection with their initialization. Following this, the transmission units of the base station BTS include the identifier into the identification message S1 to be sent to the base station controller. Said message is transmitted on the common channel CH1 which has been allocated in the PCM connection 4, and onto which the transmission units have been adjusted during assembly.

Having transmitted the identification message S1, the transmission units shift to wait state where they monitor the common channel CH1 in order to detect the message S2 transmitted from the base station controller. Upon detecting said message, the transmission units begin receiving it and storing the data which are contained in the message to a memory 6. Thus, it is possible to store in the memory 6 the transmission branching table of the base station in question, which table indicates, among other things, which PCM time slots are allocated for use by the base station BTS in question, and which PCM time slots (channels) the transmission units of the base station should repeat forward in the network.

As soon as the message S2 transmitted by the base station controller is received in full, the base station BTS discontinues using the common channel CH1 by breaking the connection to the base station controller, and adjusts its transmission units on the basis of the data stored in the memory 6. Following this, the base station transmits a new message S3 to the base station controller BSC by using a base station specific O&M channel CH5 assigned to it.

It should be noted that the description above and the figures relating to it are only intended to illustrate the present invention. Different kinds of variations and modifications of the present invention will become obvious for a person skilled in the art, without departing from the scope and spirit of the invention disclosed in the attached claims.

What is claimed is:

1. A cellular radio system comprising a base station controller and base stations connected to it, system comprising:

at least two of said base stations arranged to transmit a base station specific identification message to the base station controller by utilizing a first type communication channel during their initialization, said first type communication channel being a predetermined communication channel utilized by each of the at least two base stations;

wherein the base station controller comprises means for assigning a second type communication channel to one of said at least two base stations by utilizing said first type communication channel in response to receiving said specific identification message, said second type communication channel being a base station specific communication channel.

2. A system as claimed in claim 1, wherein the base station controller comprises a memory means for receiving and storing base station specific data fed by an operator, and means for feeding said data from the memory means to the one of said at least two base stations by utilizing said predetermined communication channel in response to the identification message.

3. A system as claimed in claim 1, wherein the base stations are connected to the base station controller by a PCM connection, whereby said predetermined communication channel consists of one or more time slots of the PCM connection, or parts of a time slot of the PCM connection.

4. A base station of a cellular radio system, comprising:

transmission units for transmitting communication signals to a base station controller and for receiving communication signals from the base station controller on a communication link;

wherein the transmission units are arranged to feed a base station specific identification message to the base station controller by utilizing initialization, a first type communication channel in response to the base station initialization, the first type communication channel being a predetermined communication channel; and wherein the base station is arranged to receive a message from the base station controller on said predetermined communication channel, and to adjust the transmission units onto a second type communication channel assigned by said message from the base station controller.

5. A base station as claimed in claim 4, wherein said communication link is a PCM connection, and said predetermined communication channel consists of one or more time slots of the PCM connection, or parts of a time slot.

6. A base station as claimed in claim 4, wherein the base station comprises manually adjustable switching means for feeding an identifier to the base station, whereby the transmission units are arranged to transmit the specific identification message which is responsive to the position of said switching means to the base station controller in response to the initialization of the base station.

7. A base station as claimed in claim 4, wherein the base station comprises a memory means for storing the data contained in the message received from the base station controller, and means for adjusting the transmission units on the basis of the data stored in said memory means.

8. A base station of a cellular radio system, comprising transmission units for transmitting communication signals to a base station controller and for receiving communication signals from the base station controller on a communication link;

wherein the transmission units are arranged to feed a base station specific identification message to the base station controller by utilizing a first type communication channel in response to the base station initialization, the first type communication channel being a predetermined communication channel;

wherein the base station is arranged to receive a message from the base station controller on said predetermined communication channel, and to adjust the transmission units onto a second type communication channel assigned by said message from the base station controller; and wherein the base station comprises manually adjustable switching means for feeding an identifier to the base station, the base station specific identification message being responsive to the position of said switching means.

* * * * *